INVENTORS
CHARLES B. SCLAR &
PAUL J. FREUD
BY GRAY, MASE & DUNSON

BY *Philip M. Dunson*
ATTORNEYS

*INVENTORS*
CHARLES B. SCLAR &
PAUL J. FREUD
BY GRAY, MASE & DUNSON
BY Philip M. Dunson
ATTORNEYS United States Patent Office
3,548,190
Patented Dec. 15, 1970

3,548,190
HIGH PRESSURE APPARATUS FOR USE IN X-RAY DIFFRACTION ANALYSIS
Charles B. Sclar, Columbus, and Paul J. Freud, Worthington, Ohio, assignors to The Battelle Development Corporation, Columbus, Ohio, a corporation of Delaware
Filed Sept. 18, 1967, Ser. No. 668,472
Int. Cl. G01n 23/20
U.S. Cl. 250—51.5                                7 Claims

ABSTRACT OF THE DISCLOSURE

High-pressure apparatus comprising a pair of opposed punches, the sides of each being tapered toward one end, means for moving the punches to exert pressure on an object positioned between the tapered ends thereof, a pair of opposing die members laterally surrounding the object, held tightly together, and contacting each other over a substantial area in a plane between the punches and transverse to their axis, each die member having a tapered portion to receive the tapered end of the corresponding punch, and a gasket positioned between the tapered portions of the die members and punches. The contacting surfaces of the die members may be formed with grooves for transmitting radiation through the object and for providing egress for diffracted radiation within a range of angles.

BACKGROUND OF THE INVENTION

This invention concerns high-pressure apparatus and more particularly high-pressure apparatus which is especially adapted for obtaining analytical measurements using electromagnetic radiation.

Recent interest in the effects of high-pressure on the structural and physical properties of materials has led to increased use of electromagnetic radiation such as X-rays for analyzing samples under pressure. X-ray diffraction methods are particularly useful for such studies. Three basic designs are now being used for high-pressure X-ray diffraction measurements. First, the diamond cell uses a pair of diamonds as Bridgman anvils and the X-ray beam is passed through the diamonds perpendicular to the anvil faces. (See: Piermarini, M. J. and Weir, C. E., J. Res. Natl. Bur. Std. (U.S.) 66A, 325 (1962); and Bassett, W. A., Takahashi, T., and Stook, P. W., Rev. Sci. Intr., 38, 37 (1967).) Second, tungsten carbide Bridgman anvils are used for X-ray diffraction measurements with the X-ray beam passing through the sample parallel to the anvil faces. (See: Jamieson, J. C. and Lawson, A. W., J. Appl. Phys., 33, 776 ( 1962); Perez-Albuerne, E. A., Foresgen, K. R., and Drickamer, H. G., Rev. Sci. Intr., 35, 29 (1964); and McWhan, D. B. and Bond, W. L., Rev. Sci. Instr., 35, 626 (1964).) The third design utilizes the tetrahedral high-pressure apparatus to generate pressure and the X-ray beam is passed in and out through the gaskets in the device. (See: Barnett, J. D. and Hall, H. T., Rev. Sci. Instr., 35, 175 ( 1964).) For use at elevated temperature, the first two designs are restricted to about 500° C. by the need to externally heat the carbide or diamond anvils although attempts have been made to internally heat carbide anvils by mixing carbon with the sample. The use of admixed carbon for resistance heating has met with only limited success largely because of chemical compatibility problems with the sample. The tetrahedral device reportedly can be internally heated to 1000° C. although in practice few results have been obtained at temperatures in excess of 500° C. This is largely due to the combination of requirements fixed by the gasket material, i.e., low X-ray absorption, proper frictional qualities and high-temperature stability. In addition, the complexity and resultant cost of multianvil devices limit their general acceptance.

In contrast to present high-pressure techniques which involve relatively bulky and heavy equipment, X-ray diffraction studies and the like demand the smallest possible apparatus in order to avoid intensity and absorption problems and to permit ease of adaption to standard radiation-emitting equipment. Also the materials from which pressure vessels may be constructed are limited to materials having low radiation absorption coefficients and many such materials are not capable of withstanding the high pressures involved. Progress in the field of high pressure structural studies of materials at elevated temperature has been slow due to lack of satisfactory high pressure apparatus.

The apparatus of the present invention utilizes a belt-type high-pressure cell with a split-die for entrance and exit of X-rays from the high pressure region. The high pressure is generated in an apparatus similar to the Hall high-compression belt apparatus described in United States Patent 2,941,248 and as later miniaturized by Bunday, as described in Bunday, F. P., J. Chem. Phys., 38, 631 (1963). The high-pressure volume is large enough for internal heating to over 1000° C. Fifty tons of ram force applied to the pistons is capable of producing in excess of 100 kilobars internal pressure on the sample depending upon the geometry and materials employed. The whole assembly, 50-ton press, die, punches, and binding rings can be constructed weighing less than 75 pounds. The device is therefore portable, small enough to avoid intensity and absorption problems, and easily adapted to standard radiation-emitting equipment. The apparatus is relatively easy to use, accurate, and inexpensive to construct; and the split die allows the pressure vessel to be constructed of high-strength material without considering absorption problems.

SUMMARY OF THE INVENTION

Typical high-pressure apparatus according to this invention comprises a pair of opposed punches, the sides of each being tapered toward one end, means to provide relative movement between the punches to exert pressure on an object positioned between the tapered ends thereof, a die laterally surrounding the object and having tapered surfaces adjacent the tapered surfaces of the punches, and a gasket between the adjacent tapered surfaces of the die and the punches. The die comprises a pair of opposed annular members coaxial with the punches, held tightly together, and contacting each other over a substantial area in a plane between the punches and transverse to their axis. The contacting surface of each die member is substantially a plane with shallow radial grooves therein registering with the corresponding grooves in the contacting surface of the other die member. The grooves may comprise a narrow groove across a diameter of each contacting surface for transmitting radiation through the object and at least one fan-shaped groove from the inner edge to the outer edge of each contacting surface for providing egress for radiation diffracted or transmitted by the object within a range of angles therefrom.

The fan-shaped grooves typically comprise an opening over the angles from about 5° to 30° on one side of one radial half of the narrow groove and an opening over the angles from about 20° to 45° on the opposite side of the same radial half of the narrow groove. An inner portion of each groove may be filled with a material, such as an epoxy resin, capable of withstanding high pressure and substantially transparent to the radiation to be passed through the groove; or each die member may be bevelled adjacent the inner edge of its contacting surface and an outwardly wedge-shaped ring member may fit snugly between the bevelled edges of the die members. The ring member should be made of a material, such as beryllium, capable of withstanding high pressure and substantially transparent to the radiation to be passed through the grooves.

The object can be heated by heating elements between the punches and adjacent to the object in a location away from all paths of ingress and egress of radiation.

DESCRIPTION OF THE PREFERRED EMBODIMENT

Figure 1:
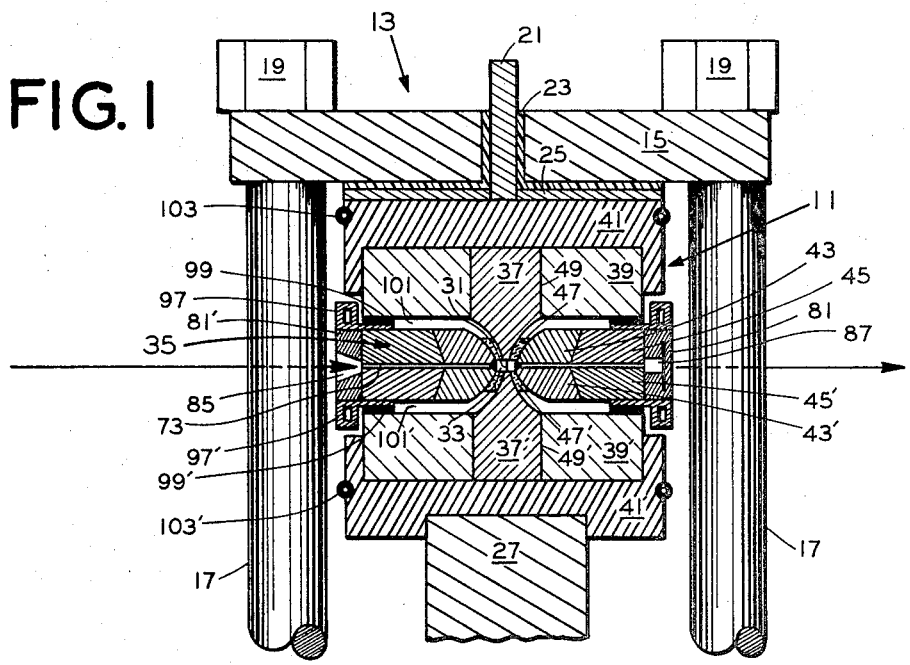
FIG. 1 is a sectional view of a hydraulic press with a high-pressure apparatus which embodies this invention.

FIG. 1 shows a high-pressure apparatus 11 according to this invention mounted in a hydraulic press 13, the base of which is not shown. The press 13 includes a frame 15 which is mounted on vertical supports 17 and secured by nuts 19. A power lead 21, which is connected to an electrical power source (not shown), extends through the frame 15 and is electrically insulated therefrom by a layer of insulating material 23. A disc 25 of an electrically conductive material, preferably copper, is joined to the power lead 21 and is also insulated from the frame 15 by the insulating material 23. The high-pressure apparatus 11 is positioned in the press 13 between the disc 25 and a hydraulic ram 27, and pressure is applied to the apparatus 11 through the ram 27.

The high-pressure apparatus 11 comprises generally two opposing punch assemblies which are disposed to apply pressure to a sample object 31 placed in a central die chamber 33 of a pressure resisting die assembly 35. The punch assemblies consist of a pair of opposed punches 37 and 37', support rings 39 and 39', and opposing positioning adapters 41 and 41'. The die assembly 35 comprises a pair of opposed annular die members 43 and 43' surrounded by binding rings 45 and 45', respectively. The upper and lower halves of the die assembly 35 are held tightly together, contacting each other over a substantial area in a plane between the punches 37 and 37' and transverse to their axis. Deformable gaskets 47 and 47' are positioned between the punches 37, 37', and the die members 43, 43', respectively, and act as seals for the die chamber 33.

The punches 37, 37' are mounted coaxially within the support rings 39 and 39', respectively, by press-fitting or shrink-fitting. The punch support ring assemblies are then centrally mounted in the cylindrical recesses of two opposing adapters 41 and 41'. The lower adapter 41' is also provided with a second cylindrical recess in its opposite surface to centrally position the ram 27.

The punches 37 and 37' are formed with generally cylindrical base portions 49 and 49' (which are fitted into the support rings 39 and 39', respectively) and gradually tapering portions 51 and 51' (shown in FIG. 2) which extend from the base portions 49 and 49' and terminate in flat pressure areas 53 and 53' (also shown in FIG. 2) of substantially lesser diameter than the base portions. The punches 37, 37' are preferably similar to those described in U.S. Patent 2,941,248, Hall, having a taper which is a smooth diametrical increase from the pressure areas 53, 53' axially along the length of the punches to base portions 49, 49'. The objective is to provide an increasing amount of metal in adjacent cross-sections of the punches 37, 37' while subjecting each cross-section to the same total force as is imposed on the pressure areas 53, 53'.

In the preferred form of the invention the punches 37, 37' are made of tungsten carbide although other high-strength materials such as hardened steels are equally applicable. The support rings 39, 39' are preferably constructed of high-strength steels.

Figure 2:
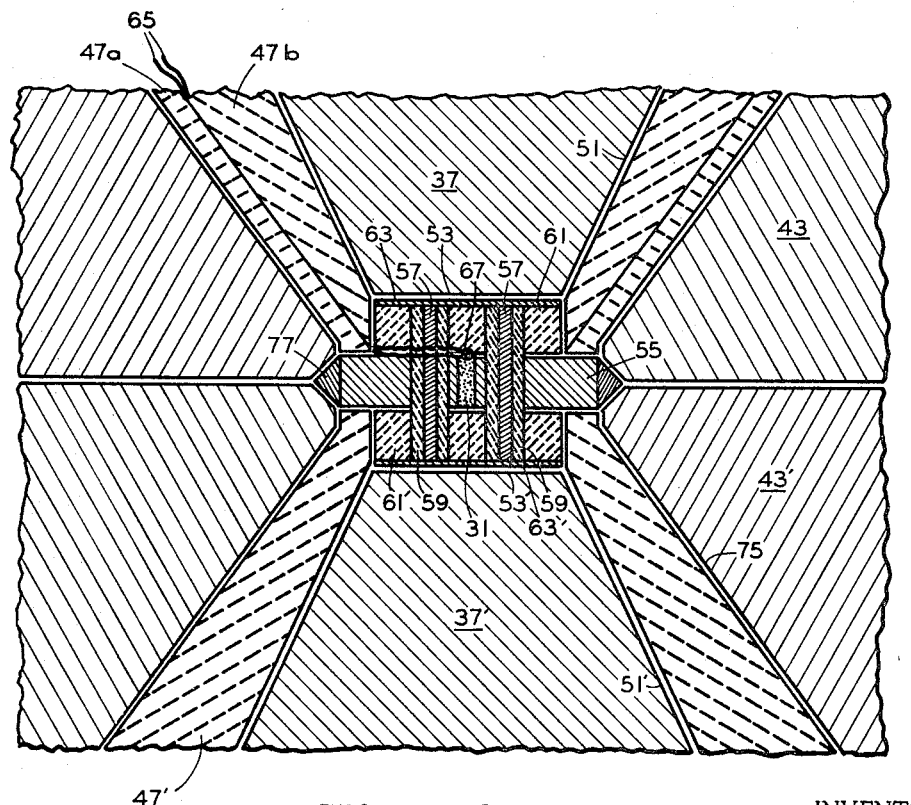
FIG. 2 is an enlarged sectional view of the center of the die assembly shown in FIG. 1, taken normal to the path of radiation through the die assembly.

As shown in FIG. 2, the sample object 31 is placed in a small hole in the center of a sample container 55. The sample container 55 is generally a pressed disc of a material with a low radiation absorption coefficient such as boron or boron nitride. It is formed with a central hole for the sample object 31 and two additional holes, one on each side of the sample hole, to accommodate a pair of heating elements 57. The heating elements 57 are preferably made of carbon and are positioned adjacent to the sample object 31 and away from all paths of ingress or egress of radiation (see FIG. 3). A tube 59 (FIG. 2) of a protective material such as boron nitride surrounds each heating element 57 and prevents reaction between the heating element 57 and the container 55 at elevated temperatures.

Still referring to FIG. 2, compressible discs 61 and 61' of a thermally and electrically insulating material such as dehydrated pyrophyllite are positioned above and below the sample container 55. The compressible discs 61, 61' are formed with holes to accommodate the tubes 59 and the heating elements 57 therein. Conducting discs 63 and 63' of an electrically conductive material such as platinum are placed between the compressible discs 61, 61' and the pressure areas 53, 53' of the punches 37 and 37', respectively. The sample object 31 is heated by passing an electric current from a power source (not shown) through the lead 21, the disc 25, the adapter 41, and the punch 37 to the conducting disc 63, which is in electrical contact with the heating elements 57. The current passes through the heating elements 57 where resistance heating takes place and continues through the conducting disc 63', the punch 37', and to the adapter 41' which is connected to complete the circuit to the power source.

Deformable gaskets 47 and 47' are placed between the tapered portions of the punches 37, 37' and the die members 43 and 43', respectively, to allow for relative movement of the punches 37, 37' while preventing extrusion of the sample container 55 and simultaneously transmitting pressure to the die changer 33. The gaskets 47, 47' are preferably constructed of pyrophyllite and serve the additional functions of sealing in the contents of the die chamber 33 and providing electrical insulation between the die members and the punches. As shown in FIG. 2, the upper gasket 47 may be constructed to two pieces, 47a and 47b, to allow for passage of thermocouple lead wires 65 between the two pieces. In this manner, the lead wires 65 are electrically insulated from the die member 43 and the punch 37. The lead wires 65 pass between the sample container 55 and the upper compressible disc 61, around the tube 59, and are connected at a thermocouple junction 67 directly over the sample object 31. The temperature is therefore read at a point very close to the center of the sample object 31 and in close proximity to the radiation beam.

Figure 3:
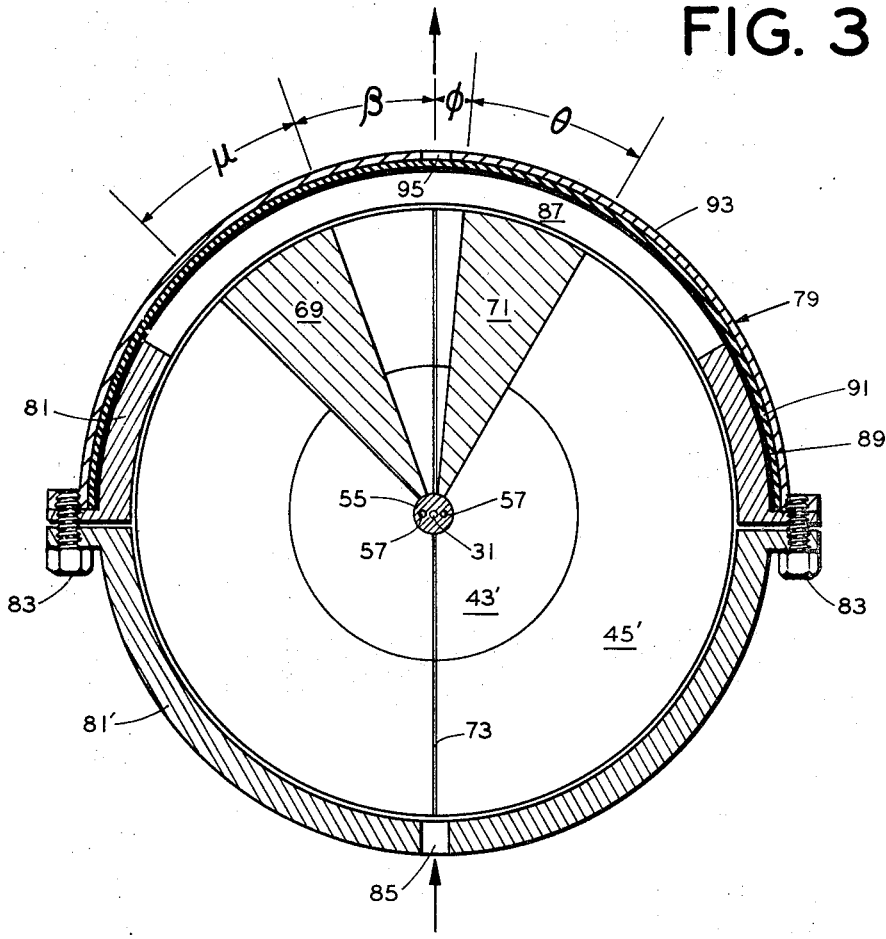
FIG. 3 is a sectional view showing the contacting surface of the lower half of the die assembly and the film cassette surrounding the die.
Figure 4:
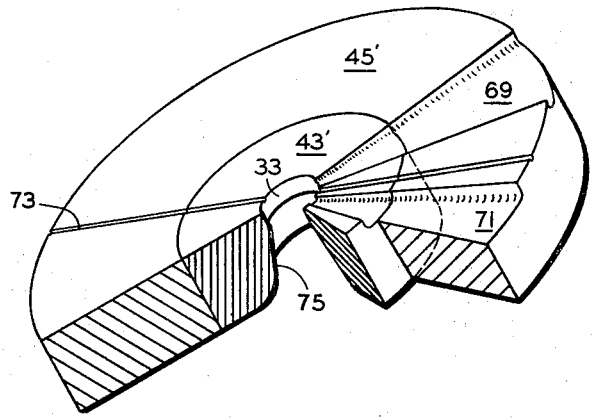
FIG. 4 is a perspective view of the lower half of the die assembly with a portion cut away.

In the preferred embodiment of the invention the die member 43' is fitted in a binding ring 45' as illustrated in FIGS. 3 and 4, preferably by press-fitting. In the preferred method, they are fitted together with a one degree taper and 0.028 cm. of interference. The die member 43' is made of hardened steel, preferably Carpenter-Hampton tool steel hardened to about 60–62 Rc. The binding ring 45' also is made of hardened steel, preferably 4340 steel hardened to about 48 Rc.

Referring to FIG. 4, the annular die member 43' has a central opening, the upper portion of which is cylindrical and generally defines the lower half of the die chamber 33. The lower portion of the central opening is formed with a gradually tapering surface 75 into which the punch 37' may move to compress the sample object 31 in the die chamber 33. Preferably the surface 75 tapers at angles substantially similar to those in the tapered portion 51' of the punch 37', although the angles may be somewhat larger depending on the configuration of the gasket 47'.

A narrow groove 73 for ingress and egress of the radiation beam is ground across a diameter of the upper or mating surface of the die member 43' and the binding ring 45'. The groove 73 is preferably about 0.025 cm. deep and 0.025 cm. wide and passes within 0.001 cm. of the center of the die member 43'. In alternate embodiments, two or more narrow grooves may be ground into the mating surfaces of the die members; their number, location and size depending on the particular use of the apparatus. One embodiment utilizes two narrow grooves, one on each side of the center of the die members, with the sample object positioned in the path of one narrow groove and the other groove used for a reference beam.

Fan-shaped radial grooves 69 and 71 provide an outlet for diffracted radiation and are ground into the mating surface of the die member 43' and the binding ring 45' on opposite sides of the exit portion of the narrow groove 73. The grooves 69, 71 are about 0.025 cm. deep at the inner edge of the die and have a slight outwardly downward taper, preferably about two degrees, which at a film distance of 57.3 mm. gives an X-ray pattern about 4 mm. high. The grooves 69, 71 may also have an initial flat region (not apparent in the drawings) extending a short distance, say about 1.25 cm., from the central die chamber 33 before the vertical taper is started. The flat region improves the pressure sealing.

FIG. 3 shows the preferred location of the radial grooves 69, 71, in the die member 43' and the binding ring 45', wherein the angle $\varphi$ is 5°, the angle $\theta$ is 25°, the angle $\beta$ is 20°, and the angle $\mu$ is 25°. The preferred locations of the fan-shaped radial grooves 69, 71 provide a range of measurable interplaner spacings ("$d$" values) using MoK$\alpha$ radiation of 8.1 A. to 0.93 A. with overlap from the two fan-shaped grooves of 1.37 A. to 2.04 A. The location and angles of the fan-shaped grooves can be fixed in accord with the radiation employed.

The overlap of the fan-shaped grooves 69, 71 (the 10° angle between 20° and 30° included within the range of angles covered by both grooves) provides an accurate method for determining the center of the diffraction pattern as at least one diffracted line will appear on both sides of the central radiation beam within the overlap angle. Thus it is possible to accurately determine the center of the diffraction pattern by simply halving the distance between a diffracted line which appears on both sides of the central beam.

The mating surface of the die member 43' and the binding ring 45' may have more than two fan-shaped grooves or may be formed with only one. The grooves may be placed anywhere on the mating surface; their number, size, and location depending on the particular use of the apparatus. The split die design allows the high pressure dies to be produced with greater accuracy and at a substantially lower cost than possible with most other die designs. The description of the die member 43 as assembled with the binding ring 45' will suffice for the die member 43 and the binding ring 45 also with the exception that the fan-shaped grooves 69 and 71 are in the mirror image position so that the corresponding grooves will be in alignment when the die members are held together in the die assembly 35.

The die members 43, 43' and their binding rings 45, 45' are held tightly together in the die assembly 35 (FIG. 1), contacting each other over a substantial area in a plane between the punches 37, 37' and transverse to their axis with the fan-shaped radial grooves and the narrow diametral groove of each mating surface registering with the fan-shaped radial grooves and the narrow diametral groove of the other surface. Either of two methods may be employed to prevent extrusion of the contents of the die chamber 33 into the fan-shaped radial grooves 69, 71 or the narrow diametral groove 73 during the application of pressure to the die assembly. One method uses epoxy resin to fill the grooves for a short distance around the die chamber 33. A clear epoxy loaded with about 50 to 75 percent by weight of amorphous boron is preferred although other epoxy compositions are satisfactory. An excess of the epoxy material is applied to the grooves and then lapped parallel to the mating surface of the die after curing. The epoxy-boron composition has a linear absorption coefficients for MoK$\alpha$ X-rays of approximately 1.0 cm.$^{-1}$ which results in an attenuation of intensity for the described configuration of 65 percent. When using the epoxy seal, the temperature of the inner edges of the die members 43, 43' must be sufficiently low to maintain the bond between the epoxy and the die members. The temperature of the inner edges of the die members where the epoxy seal is located is generally substantially lower than the internal temperature of the sample and is determined by the size of the die chamber 33, the location of heating elements 57 and the materials employed for the sample container 55, tubes 59, and heating elements 57. Thus, the sample object 31 may be maintained at a temperature substantially higher than the temperature at which the epoxy loses its bonding strength.

The second method of preventing extrusion is illustrated in FIG. 2 wherein the sample container 55 is surrounded with an outwardly wedge-shaped ring 77 of a material capable of withstanding high pressure and substantially transparent to the radiation to be passed through the grooves. The die members 43, 43' are beveled adjacent the inner edge of their mating surfaces such that wedge-shaped ring 77 fits snugly between the beveled edges of the die members 43, 43'. The wedge-shaped ring 77 is preferably made of beryllium because of its low X-ray absorption coefficient (less than 10 percent loss) and high-temperature stability. It is ordinarily necessary to replace the wedge-shaped ring after each run because a small amount of the ring material may extrude into the fan-shaped grooves and the diametral groove. The cost of replacement is not excessive.

Referring again to FIG. 3, a film cassette 79 laterally surrounds the die assembly and includes two flanged semicircular members 81 and 81' which are clamped around the outer circumference of the die assembly and are secured by bolts 83. The member 81' is provided with a central aperture 85 which is aligned with the ingress portion of the narrow groove 73 to admit radiation to the die chamber which contains the sample container 55 and the sample object 31. The member 81 is formed with an elongated slot 87 which is sufficiently large to permit egress of all radiation passing through the fan-shaped grooves 69, 71 and the exit portion of the narrow groove 73. A very thin strip of metal foil 89, such as aluminum foil, is placed around the exterior of the member 81 to seal out light. Standard X-ray film (not shown) is sandwiched between the foil strip 89 and a thin rubber strip 91 and the entire assembly is held in place by a flanged semicircular outer strap member 93 which is also secured by the bolts 83. The strap 93 may have a central aperture 95 for egress of the central radiation beam.

In operation, an X-ray beam enters through the aperture 85 of the member 81' and passes along the narrow groove 73 to the sample object 31. The X-ray beam is diffracted by the sample object 31 and the diffracted X-radiation which falls within the angles of the fan-shaped grooves 69, 71 passes out through these grooves, through the slot 87 and metal foil 89 to the film on which the diffracted rays are recorded. A portion of the X-ray beam passes without deviation through the sample object 31, travels along the exit portion of the narrow groove 73, records a reference spot on the film and exits through the aperture 95. In the preferred embodiment a Debye-Scherrer geometry is used wherein the film is positioned on a radius of 57.3±0.03 mm. as measured from the center of the die chamber 33. At a load of 50 tons the outer diameter of the die assembly expands less than 0.02 mm. thus providing a stable reference distance from the sample object 31 to the film.

Referring again to FIG. 1, the die assembly 35 is mounted in the hydraulic press 13 between the punch assemblies. The die assembly 35 is spaced from the punch assemblies by the flanged portion of annular cooling rings 97 and 97' and by annular rubber shims 99 and 99'. Air spaces 101 and 101' are thus provided to accommodate the stroke of the punch assemblies. The exterior of the apparatus is cooled by passing a coolant fluid through the flanged cooling rings 97, 97' and through the secondary cooling rings 103 and 103' which are recessed in the outer surfaces of the adapters 41, 41'. A load is then applied to the apparatus and the device is checked for alignment with respect to the radiation source before the film cassette is secured to the die assembly.

In operation, the precision of the split die device of this invention is comparable to that of Bridgman anvil X-ray and tetrahedral X-ray devices (±0.2% to 0.4% for lattice parameter measurements, depending on the sample). The film is positioned co-axially with the die assembly and the film to die center distance is known to an accuracy of ±0.03 mm. The angles of the fan-shaped grooves are measured after they are ground to an accuracy of ±0.01° and the edges of the grooves are clearly defined on the X-ray film, thus providing an accurate means for determining the diffraction pattern center and film shrinkage. Post-mortem microscopic examinations of sample position indicate that shifts from center are less than 0.1 mm. For precision measurements, the sample diameter is made as small as possible, preferably less than 0.3 mm. Thus when the diameter of the X-ray beam is larger than the sample, the resulting diffraction lines have a width which is proportional to the sample diameter.

The apparatus of this invention has been disclosed in conjunction with its application to high-pressure high-temperature X-ray diffraction studies. The drawings and discussion were confined to such applications although many other applications, not limited to electromagnetic analytical measurements, are possible. The split die design can also be adapted for other high-pressure high-temperature studies including Mössbauer spectroscopy and optical spectroscopy using the visible, infrared, and ultraviolet regions of the radiation spectrum.

It will be understood, of course, that while the forms of the invention herein shown and described constitute the preferred embodiments, it is not intended to illustrate all possible forms of the invention. It will also be understood that the words used are words of description rather than of limitation and that various changes may be made without departing from the spirit and scope of the invention herein disclosed.

What is claimed is:

1. High pressure apparatus comprising a pair of opposed punches, the sides of each being tapered toward one end,
   means to provide relative movement between said punches to exert pressure on an object positioned between the tapered ends thereof,
   a die laterally surrounding said object and having tapered surfaces adjacent the tapered surfaces of said punches,
   and a gasket between the adjacent tapered surfaces of said die and said punches,
   wherein
   said die comprises a pair of opposed annular members coaxial with said punches, held tightly together, and contacting each other over a substantial area in a plane between said punches and transverse to their axis, the contacing surface of each said die member being substantially a plane with a shallow narrow groove across the diameter for transmitting radiation through said object and at least one shallow fan-shaped groove from the inner edge to the outer edge for providing egress for radiation diffracted or transmitted by said object within a range of angles therefrom, each groove registering with a groove in the contacting surface of the other said die member, and wherein extrusion preventing means are interposed at the inner ends of said grooves, said extrusion preventing means being constructed of a material capable of withstanding high pressure and substantially transparent to the radiation to be passed through said groove.

2. Apparatus as in claim 1, wherein said fan-shaped grooves comprise an opening over the angles from about 5° to 30° on one side of one radial half of said narrow groove and an opening over the angles from about 20° to 45° on the opposite side of said radial half of said narrow groove.

3. Apparatus as in claim 1, wherein an inner portion of each said groove is filled with said extrusion preventing means.

4. Apparatus as in claim 3, wherein said material is an epoxy resin.

5. Apparatus as in claim 1, wherein each said die member is bevelled adjacent the inner edge of its contacting surface and said extrusion preventing means is an outwardly wedge-shaped ringe member which fits snugly between the bevelled edges of said die members.

6. Apparatus as in claim 2, wherein said ring member is constructed of beryllium.

7. Apparatus as in claim 1, wherein said object is heated by at least one heating element between said punches and adjacent to said object in a location away from all paths of ingress and egress of radiation.

References Cited

UNITED STATES PATENTS

| | | | |
|---|---|---|---|
| 2,941,248 | 6/1960 | Hall | 18—16.5 |
| 3,350,743 | 11/1967 | Ishizuka | 18—16.5 |
| 3,337,731 | 8/1967 | Kuznetsov et al. | 250—51.5 |

OTHER REFERENCES

The Review of Scientific Instruments, vol. 35, No. 1; Perez-Albuerne et al.; 1964; pp. 29 to 33.

WALTER STOLWEIN, Primary Examiner

A. L. BIRCH, Assistant Examiner

U.S. Cl. X.R.

18—16.5

Dedication 3,548,190.—*Charles B. Sclar*, Columbus and *Paul J. Freud*, Worthington, Ohio. HIGH PRESSURE APPARATUS FOR USE IN X-RAY DIFFRACTION ANALYSIS. Patent dated Dec. 15, 1970. Dedication filed May 7, 1973, by the assignee, *The Battelle Development Corporation*.

Hereby dedicates to the People of the United States the entire remaining term of said patent.

[*Official Gazette December 25, 1973.*]